United States Patent
Attard et al.

(10) Patent No.: US 9,446,768 B2
(45) Date of Patent: Sep. 20, 2016

(54) SYSTEM AND METHOD FOR ENERGY OPTIMIZATION IN AUTONOMOUS VEHICLE OPERATION

(71) Applicant: Ford Global Technologies, LLC, Dearborn, MI (US)

(72) Inventors: Christopher Attard, Ann Arbor, MI (US); Dale Scott Crombez, Livonia, MI (US); Jerome Charles Ivan, Troy, MI (US); John P. Joyce, West Bloomfield, MI (US); James Robert McBride, Saline, MI (US); Wayne Williams, Livonia, MI (US); Paul Joseph Szuszman, Ann Arbor, MI (US); Peter Worrel, Troy, MI (US); Hai Yu, Canton, MI (US); John Shutko, Ann Arbor, MI (US); Jeff Allen Greenberg, Ann Arbor, MI (US); Rajit Johri, Ann Arbor, MI (US); Devinder Singh Kochhar, Ann Arbor, MI (US); Hongtei Eric Tseng, Canton, MI (US); Douglas Scott Rhode, Farmington Hills, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 122 days.

(21) Appl. No.: 14/226,436

(22) Filed: Mar. 26, 2014

(65) Prior Publication Data
US 2015/0274169 A1 Oct. 1, 2015

(51) Int. Cl.
*B60W 30/18* (2012.01)
*B60W 10/18* (2012.01)
*B60W 10/04* (2006.01)
*B60W 10/06* (2006.01)
*B60W 10/08* (2006.01)

(52) U.S. Cl.
CPC ........ *B60W 30/18181* (2013.01); *B60W 10/04* (2013.01); *B60W 10/06* (2013.01); *B60W 10/08* (2013.01); *B60W 10/18* (2013.01); *B60W 20/13* (2016.01); *B60W 30/18009* (2013.01); *B60W 30/18127* (2013.01); *Y10S 903/93* (2013.01)

(58) Field of Classification Search
None
See application file for complete search history.

(56) References Cited

U.S. PATENT DOCUMENTS

| | | | | |
|---|---|---|---|---|
| 5,361,213 A | * | 11/1994 | Fujieda | B60K 31/0008 123/406.38 |
| 5,895,100 A | | 4/1999 | Ito et al. | |

(Continued)

FOREIGN PATENT DOCUMENTS

| | | |
|---|---|---|
| CN | 101913352 | 11/2012 |
| GB | 2516257 A | 1/2015 |

(Continued)

OTHER PUBLICATIONS

UK Search Report dated Oct. 19, 2015 (9 pages).

*Primary Examiner* — Mussa A Shaawat
*Assistant Examiner* — Kyung Kim
(74) *Attorney, Agent, or Firm* — Frank A. MacKenzie; Bejin Bieneman PLC

(57) ABSTRACT

Vehicle operating systems are autonomously operated. A transient in an upcoming path of the vehicle is determined from a comparison of vehicle path data and vehicle status data to a threshold of mechanism first operating system. Operational parameters for one of first and second operating systems are selected according to the comparison. The selected operational parameters are applied to the operation of the one of the first and second operating systems.

16 Claims, 3 Drawing Sheets

(56) References Cited

U.S. PATENT DOCUMENTS

| | | |
|---|---|---|
| 8,060,287 B2 | 11/2011 | Headlee et al. |
| 8,135,526 B2 | 3/2012 | Minarcin et al. |
| 8,290,701 B2 | 10/2012 | Mason et al. |
| 8,527,132 B2 | 9/2013 | Mineta |
| 2010/0256835 A1 | 10/2010 | Mudalige |
| 2011/0276243 A1 | 11/2011 | Minarcin et al. |
| 2013/0073125 A1* | 3/2013 | Araki .................. B60L 7/14 701/19 |
| 2013/0268162 A1 | 10/2013 | Ponziani |
| 2014/0074369 A1 | 3/2014 | Kim et al. |
| 2014/0163833 A1 | 6/2014 | Kim |
| 2015/0019058 A1 | 1/2015 | Georgiev |

FOREIGN PATENT DOCUMENTS

| | | |
|---|---|---|
| WO | 2014080696 | 5/2014 |
| WO | 2015045436 | 4/2015 |

* cited by examiner

SYSTEM AND METHOD FOR ENERGY OPTIMIZATION IN AUTONOMOUS VEHICLE OPERATION

BACKGROUND

A vehicle such as an automobile may be configured for autonomous driving operations. For example, the vehicle may include a central control unit or the like—i.e., a computing device having a processor and a memory—that receives data from various vehicle data collection devices such as sensors and also external data sources such as navigation information. The central control unit may then provide instructions to various vehicle components—e.g., actuators and the like—that control steering, braking, acceleration, etc., to control vehicle operations without action, or with reduced action, by a human operator. It is desirable, but currently difficult, to provide an autonomous vehicle that dynamically selects operational instructions to optimize energy efficiency for the vehicle during transient operations, such as braking and acceleration.

DRAWINGS

DETAILED DESCRIPTION

System Overview

Figure 1:
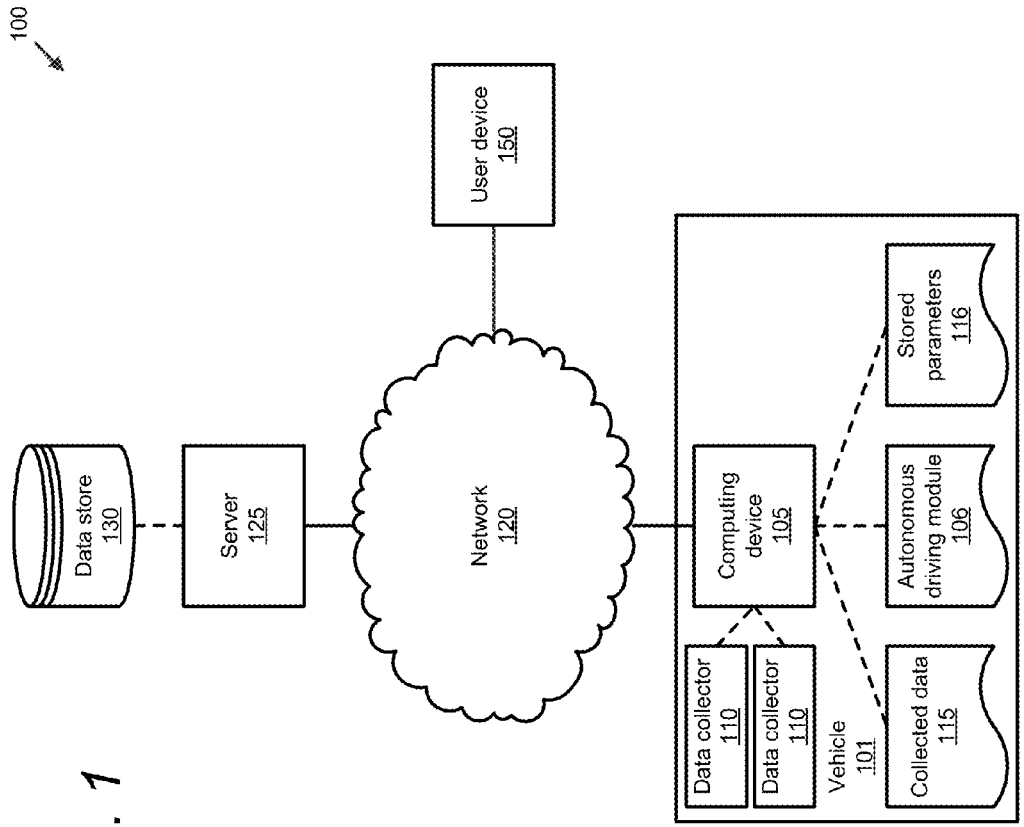
FIG. 1 is a block diagram of an exemplary autonomous vehicle system.

FIG. 1 is a block diagram of an exemplary autonomous vehicle system 100. A computer 105 may be configured for communicating with one or more remote sites such as a server 125 via a network 120, such remote site possibly including a data store 130. A vehicle 101 includes the vehicle computer 105 that is configured to receive information, e.g., collected data 115, from one or more data collectors 110 related to various components or conditions of the vehicle 101, e.g., components such as a braking system, a power storage system, a steering system, a powertrain, etc., and/or conditions such as vehicle 101 speed, acceleration, pitch, yaw, roll, remaining fuel, etc. Collected data 115 may also include user input, such as a destination for vehicle 101. The computer 105 generally includes an autonomous driving module 106 that comprises instructions for autonomously, i.e., without operator input, operating the vehicle 101, including possibly in response to instructions received from a server 125. Further, the computer 105, e.g., in the module 106, generally includes instructions for receiving data, e.g., from one or more data collectors 110 and/or a human machine interface (HMI), such as an interactive voice response (IVR) system, a graphical user interface (GUI) including a touchscreen or the like, etc.

Autonomous operations in the vehicle 101 may be governed by one or more stored parameters 116. By evaluating collected data 115 with respect to one or more stored parameters 116 being used during autonomous driving operations, the computing device 105 can determine whether to adjust one or more of the parameters 116. For example, the module 106 may change a parameter 116 related to a determining which of a regenerative braking mechanism and a friction braking mechanism the braking system is utilizing to decelerate the vehicle 101 according to a deceleration requirement, detected object, road condition, environmental condition or the like, e.g., wind, precipitation, etc. that may be detected or inferred by a data collector 110.

Exemplary System Elements

A vehicle 101 includes a vehicle computer 105 that generally includes a processor and a memory, the memory including one or more forms of computer-readable media, and storing instructions executable by the processor for performing various operations, including as disclosed herein. Further, the computer 105 may include more than one computing device, e.g., controllers or the like included in the vehicle 101 for monitoring and/or controlling various vehicle components, e.g., an engine control unit (ECU), transmission control unit (TCU), etc. The computer 105 is generally configured for communications on a controller area network (CAN) bus or the like. The computer 105 may also have a connection to an onboard diagnostics connector (OBD-II). Via the CAN bus, OBD-II, and/or other wired or wireless mechanisms, the computer 105 may transmit messages to various devices in a vehicle and/or receive messages from the various devices, e.g., controllers, actuators, sensors, etc., including data collectors 110. Alternatively or additionally, in cases where the computer 105 actually comprises multiple devices, the CAN bus or the like may be used for communications between devices represented as the computer 105 in this disclosure. In addition, the computer 105 may be configured for communicating with the network 120, which, as described below, may include various wired and/or wireless networking technologies, e.g., cellular, Bluetooth, wired and/or wireless packet networks, etc.

Generally included in instructions stored in and executed by the computer 105 is an autonomous driving module 106. Using data received in the computer 105, e.g., from data collectors 110, data included as stored parameters 116, the server 125, etc., the module 106 may control various vehicle 101 components and/or operations without a driver to operate the vehicle 101. For example, the module 106 may be used to regulate vehicle 101 speed, acceleration, deceleration, steering, operation of components such as lights, windshield wipers, etc. Further, the module 106 may include instructions for evaluating information received in the computer 105 relating to vehicle 101 operator characteristics, e.g., from an HMI and/or data collectors 110.

Data collectors 110 may include a variety of devices. For example, various controllers in a vehicle may operate as data collectors 110 to provide data 115 via the CAN bus, e.g., data 115 relating to vehicle speed, acceleration, power storage capacity, fuel range, etc. Further, sensors or the like, global positioning system (GPS) equipment, etc., could be included in a vehicle and configured as data collectors 110 to provide data directly to the computer 105, e.g., via a wired or wireless connection. Sensor data collectors 110 could include communication devices to send and receive information from other vehicles, such as path intentions from vehicles surrounding vehicle 101. Sensor data collectors 110 could include mechanisms such as RADAR, LADAR, sonar, etc. sensors that could be deployed to measure a distance between the vehicle 101 and other vehicles or objects. Yet other sensor data collectors 110 could include cameras, breathalyzers, motion detectors, etc., i.e., data collectors 110 to provide data for evaluating a condition or state of a vehicle 101 operator. In addition, data collectors 110 may include sensors to detect a position, change in position, rate of change in position, etc., of vehicle 101 components such as a steering wheel, brake pedal, accelerator, gearshift lever, etc.

A memory of the computer 105 generally stores collected data 115. Collected data 115 may include a variety of data collected in a vehicle 101. Examples of collected data 115 are provided above, and moreover, data 115 is generally collected using one or more data collectors 110, and may additionally include data calculated therefrom in the computer 105, and/or at the server 125. In general, collected data 115 may include any data that may be gathered by a collection device 110 and/or computed from such data. Accordingly, collected data 115 could include a variety of data related to vehicle 101 operations and/or performance, data received from another vehicle, as well as data related to environmental conditions, road conditions, etc. relating to the vehicle 101. For example, collected data 115 could include data concerning a vehicle 101 speed, acceleration, pitch, yaw, roll, braking, presence or absence of precipitation, tire pressure, tire condition, etc.

Vehicle 101 includes a braking system with a regenerative braking mechanism and a friction braking mechanism. The regenerative braking mechanism uses mechanical energy from the deceleration of vehicle 101 to recharge the electrical system of vehicle 101. Regenerative braking mechanisms have braking torque limits 116a, 116b that decrease in magnitude with an increase in vehicle speed, as illustrated in exemplary FIG. 2. Torque limits for a regenerative braking mechanism can be calculated as a function of a powertrain power limit, wheel speed, powertrain torque limit, and torque limits required to maintain stability of vehicle 101. Additionally, the electrical system for vehicle 101 generally has a limit as to how much electrical energy it can store, e.g., in batteries and the like. Vehicle 101 may also include, for example, an acceleration system with an electrical power component and a combustion power component.

Returning to FIG. 1, a memory of the computer 105 may further store parameters 116. A parameter 116 generally governs control of, for example, an operational system such as the braking and acceleration systems for vehicle 101, and is generally associated with an expected performance of those systems, such as stopping distance and deceleration and acceleration rates of vehicle 101. These parameters vary due to an environmental condition, road condition, vehicle 101 condition, or the like. For example, a braking parameter 116 may specify an amount of force and rate of application to be applied to a vehicle 101 braking system, e.g., a regenerative braking mechanism or a friction braking mechanism, either by default, or according to one or more environmental conditions, road conditions, vehicle 101 conditions, etc., e.g. an intensity or type of precipitation, an unpaved road, worn tires, snow and/or ice conditions, etc. to achieve a desired stopping distance and deceleration rate.

Figure 2:
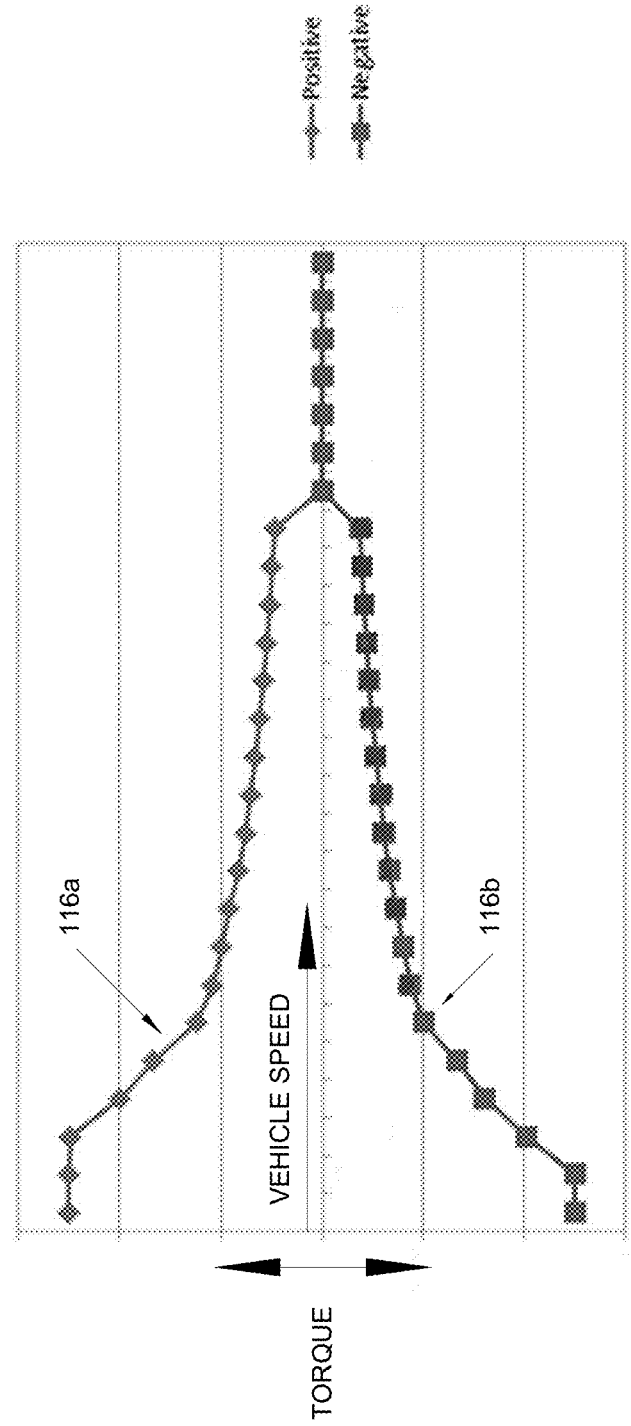
FIG. 2 is a diagram of a graph of torque limits in an exemplary regenerative braking mechanism.

The parameters 116 include operational thresholds for the mechanisms of the operational systems, such as the braking and acceleration systems. For example, the braking parameters include torque limits 116a, 116b for the regenerative braking mechanism and additional power storage capacity limits for the electrical system electrically coupled to the regenerative braking mechanism. These thresholds vary at least due to vehicle 101 condition. For example, the torque limits for the regenerative braking mechanism, as illustrated in FIG. 2, vary according to the speed of vehicle 101. The additional power storage capacity limits for the electrical system of vehicle 101 varies based on the amount of power stored at a given time. In another example, the braking parameters 116 may include thresholds for operation of an anti-lock braking system (ABS) of vehicle 101, based on, for example, collected data 115 regarding road conditions and the speed of vehicle 101, at which conditions vehicle 101 is configured to utilize friction braking in the ABS application. The parameters 116 also include operating profiles for the braking mechanisms to provide a given deceleration within the selected thresholds for the braking mechanisms. Furthermore, for example, the parameters 116 may also include thresholds for operation of an electrical power component and a combustion power component of an acceleration system of vehicle 101, such as the maximum rate of acceleration which can be achieved by the power limit for the electrical power component under the current conditions for vehicle 101.

Returning to FIG. 1, the network 120 represents one or more mechanisms by which a vehicle computer 105 may communicate with a remote server 125. Accordingly, the network 120 may be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth, IEEE 802.11, etc.), local area networks (LAN) and/or wide area networks (WAN), including the Internet, providing data communication services.

The server 125 may be one or more computer servers, each generally including at least one processor and at least one memory, the memory storing instructions executable by the processor, including instructions for carrying out various steps and processes described herein. The server 125 may include or be communicatively coupled to a data store 130 for storing collected data 115 and/or parameters 116. For example, collected data 115 relating to road conditions, weather conditions, etc. could be stored in the data store 130, and provided by the server 125 to the computer 105. Likewise, parameters 116 could be provided from the data store 130 via the server 125. For example, parameters 116 could be updated for a particular vehicle 101 or type of vehicle 101, and then the updated parameters 116 could be provided to the module 106.

A user device 150 may be any one of a variety of computing devices including a processor and a memory, as well as communication capabilities. For example, the user device 150 may be a portable computer, tablet computer, a smart phone, etc. that includes capabilities for wireless communications using IEEE 802.11, Bluetooth, and/or cellular communications protocols. Further, the user device 150 may use such communication capabilities to communicate via the network 120 and also directly with a vehicle computer 105, e.g., using Bluetooth. Accordingly, a user device 150 may be used to carry out certain operations herein ascribed to a data collector 110, e.g., voice recognition functions, cameras, global positioning system (GPS) functions, etc., in a user device 150 could be used to provide data 115 to the computer 105. Further, a user device 150 could be used to provide a human machine interface (HMI) to the computer 105, such as, for example, an input for a navigation system.

Exemplary Process Flows

Figure 3:
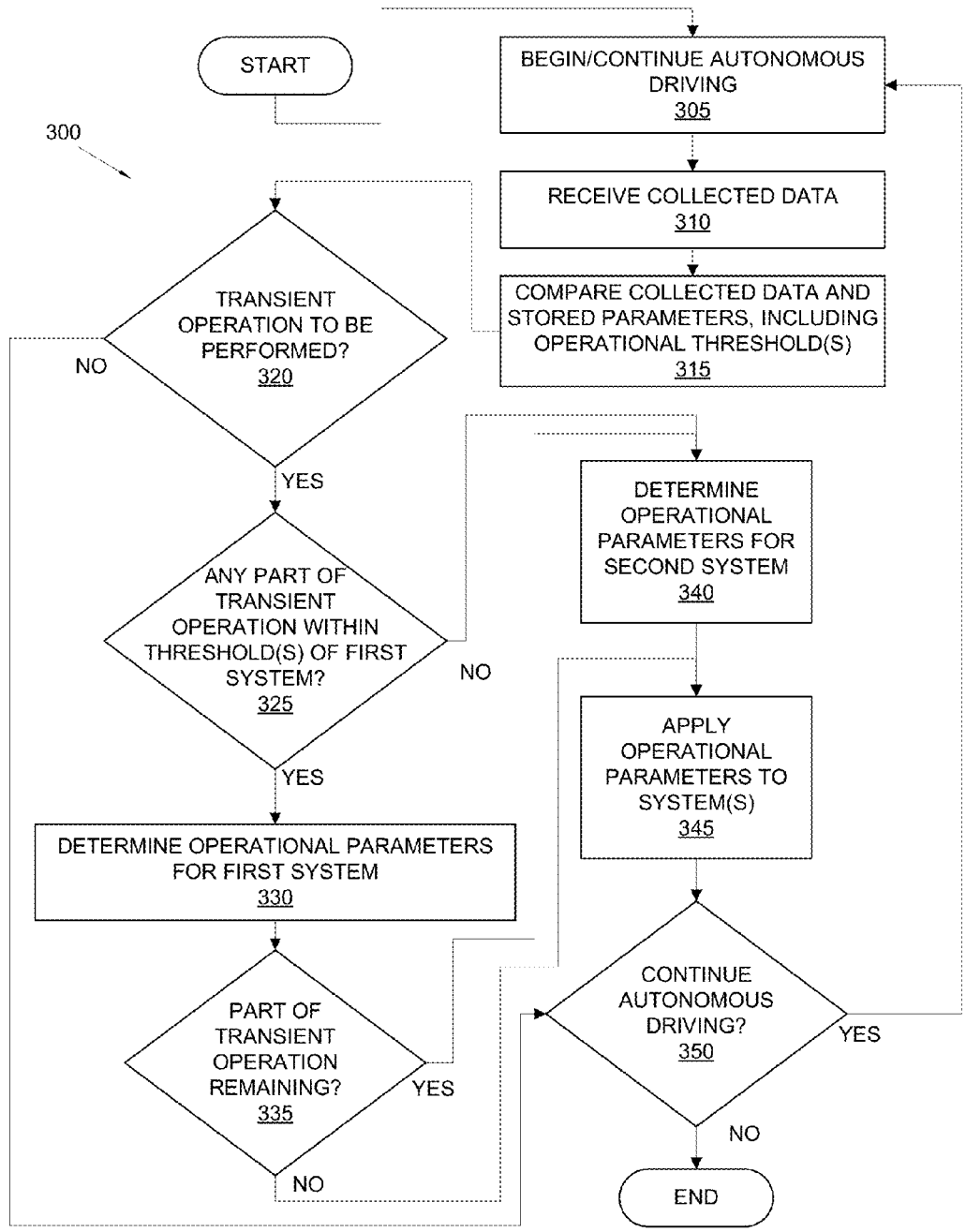
FIG. 3 illustrates an exemplary process for determining parameters for a transient operation in an autonomous vehicle.

FIG. 3 is a diagram of an exemplary process 300 for controlling braking in an autonomous vehicle with a braking system having a regenerative braking mechanism and a friction braking mechanism.

The process 300 begins in a block 305, in which the vehicle 101 commences or continues autonomous driving operations, i.e., begins driving in a manner partially or completely controlled by the autonomous driving module 106. For example, all vehicle 101 operations, e.g., steering, braking, speed, etc., could be controlled by the module 106 in the computer 105. However, it is also possible that, in the block 305, the vehicle 101 may be operated in a partially autonomous (i.e., partially manual, fashion, where some operations, e.g., steering, could be manually controlled by a driver, while other operations, e.g., including braking, could be controlled by the computer 105).

Following the block 305, in a block 310, the computer 105 receives collected data 115. As mentioned above, collected data 115 may be provided via one or more of a variety of data collection devices 110, and may include data concerning vehicle 101 speed, pitch, yaw, roll, power storage capacity, environmental conditions, road conditions, etc. Collected data 115 generally also includes a position of a braking mechanism, e.g., a brake pedal, braking force, etc., and may also include, for example, a destination input by a user of vehicle 101.

Following the block 310, in blocks 315-320, the computer 105 compares collected data 115 gathered as described with respect to the block 310, with certain of parameters 116, including operational thresholds for operating systems such as the braking and acceleration systems, to determine whether to perform a transient operation of vehicle 101, i.e. whether deceleration of vehicle 101 is required or acceleration of vehicle 101 is required. For example, the computer 105 compares the current speed of the vehicle and the anticipated path, such as an oncoming curve, a changing road condition, a relatively slow preceding vehicle, as determined through collected data 115, to at least one operating threshold of a regenerative braking mechanism of the braking system of the vehicle 101. For example, based on a speed and operating condition of the vehicle 101 from the collected data 115, the computer 105 evaluates whether the regenerative braking mechanism may perform a deceleration operation or requirement within the torque limits 116a, 116b of the regenerative braking mechanism and/or the operational thresholds of the friction braking mechanism. In another example, the computer 105 evaluates whether the electrical power component of an acceleration system for the vehicle 101 can achieve an acceleration operation. Based on the comparison, the computer 105 determines whether an acceleration operation for vehicle 101 is to be performed through the module 106. In another example, the collected data 115 includes data related to the destination and range of the vehicle 101, and vehicle operations are optimized toward arriving at the destination. Accordingly, the autonomous operation of vehicle 101 depends upon the operation thresholds of particular operating systems, e.g. regenerative braking mechanisms and electrical power components of acceleration systems, towards optimizing energy efficiency during autonomous operation. Therefore, where possible, the path of the vehicle 101 is controlled within operating thresholds of operating systems that provide relative energy efficiency, such as regenerative braking mechanisms and electrical power components of acceleration systems.

In one example of comparing an operational threshold of an operating system of vehicle 101 towards determining whether to perform a transient operation, the computer 105 calculates the demanded torque of the braking system of the vehicle 101 to achieve a deceleration target determined from the collected data 115. The computer 105 compares the demanded torque, as a calculated performance condition, with the torque limits 116a, 116b of the regenerative braking mechanism, to determine whether the regenerative braking mechanism can meet all or part of the deceleration target with an operating profile within the torque limits 116a, 116b. Therefore, to the extent that a required transient operation is determined through the collected data 115, the computer 105 can dynamically identify a transient operation within the operational limits of a particular operating system, such as a regenerative braking mechanism for a deceleration operation. In another example, the computer 105 compares the demanded torque and the operating conditions of vehicle 101 to the ABS thresholds, to determine whether the regenerative braking mechanism can meet all or part of the deceleration target and avoid engagement of the ABS application, to allow for use of the regenerative braking mechanism. In yet another example, the computer 105 calculates the demanded acceleration power amount to achieve an acceleration target, and compares that amount to operational thresholds of the electrical power component of the acceleration system is a power limit.

In another example, the computer 105 evaluates power generation performance conditions according to a deceleration target determined from the collected data 115 to determine whether the regenerative braking mechanism will generate power in excess of the current additional power storage capacity of the electrical system of the vehicle 101. In this example of determining performance conditions demanded by a deceleration target, performance conditions include an element specifying an amount of power that could be generated by regenerative braking to meet the deceleration target. Accordingly, the computer 105 calculates the anticipated amount of power to be generated by the regenerative braking mechanism in meeting the deceleration target. The computer 105 compares the anticipated amount of power, as the calculated performance condition, with a power storage capacity of the electrical system of the vehicle 101, to determine whether all or part of the anticipated power generation can be utilized by the vehicle 101.

If no transient operation is to be performed, then a block 350 is executed after block 320, to determine if vehicle 101 is to remain in autonomous mode. If not, e.g. the vehicle 101 has reached its destination or the operator of the vehicle 101 has initiated transfer of the autonomous operation to manual operation, the process 300 ends. If vehicle 101 remains in autonomous operation, e.g. the vehicle 101 has yet to reach a destination input as a part of collected data 115, the process 300 returns to blocks 305, 310, and 315.

If computer 105 determines that a transient operation is to be performed at block 320, next, in a block 325, the computer 105 determines whether the transient operation is within at least one operating threshold of a first operating system. For example, if the transient operation is a deceleration operation or requirement, the first operating system corresponds to the regenerative braking mechanism of the braking system of the vehicle 101. In another example, if the transient operation is an acceleration operation, the first operating system corresponds to the electrical power component of the acceleration system of the vehicle 101.

If the first operating system, e.g. the regenerative braking mechanism in the event of a deceleration operation, can meet all or part of the deceleration requirement within its operational thresholds, next, in a block 330, the computer 105 selects operational parameters for the first operating system from the stored parameters 116. For example, for a deceleration operation, the computer 105 selects parameters 116 to operate the regenerative braking mechanism in a profile that generally provides lower deceleration at higher vehicle speeds and increases in deceleration at lower vehicles speeds, in accordance with the torque limits 116a, 116b of the regenerative braking mechanism illustrated at FIG. 2, in order to maximize the power regeneration of the operation of the regenerative braking mechanism. Accordingly, where possible, process 300 provides for at least partial regenerative braking of vehicle 101 and, therefore, results in an increased energy efficiency of vehicle 101. In another example, for an acceleration operation, the computer 105 selects operational parameters for the electrical power component of the acceleration system.

Returning to FIG. 3, following the selection in the block 330 of the operational parameters for the first operating system from the stored parameters 116, at a block 335, the computer 105 determines whether there is any expected remainder of the transient operation, in the event that only a part of the transient is determined to be within the operational thresholds of the first operating system. For example, for a deceleration operation, if the vehicle 101 has a relatively limited power storage capacity (i.e. the vehicle 101 is nearly fully charged), and the anticipated power generation exceeds this capacity, computer 105 selects parameters 116 for the regenerative braking mechanism such that the power storage capacity is fully utilized and the deceleration requirement is partially met. In another example, for a deceleration operation, if the demanded torque only partially exceeds the torque limit of the regenerative braking mechanism, the computer 105 selects parameters 116 for the regenerative braking mechanism corresponding to the part of the braking operation in which the demanded torque is within the torque limits 116a, 116b of the regenerative braking mechanism. In another example, for an acceleration operation, the computer 105 selects parameters 116 for the electrical power component of the acceleration system corresponding to the part of the acceleration operation in which the demanded torque is within the limits of the electrical power component.

If, as determined at the block 325, the first operating system cannot meet any of the transient operation within one or more operational thresholds, e.g., for a deceleration operation, the deceleration requirement requires a braking torque which exceeds one of the torque limits 116a, 116b of the regenerative braking mechanism, or, as determined at the block 335, the first operating mechanism can only partially meet the transient operation, in a block 340, the computer 105 selects the operational parameters for the second operating system from the stored parameters 116. For example, for a deceleration operation, the computer 105 may select operational parameters for the friction braking mechanism to allow for partial use of the regenerative braking mechanism, such as, in some exemplary vehicle path and vehicle status conditions, initial operation of the friction braking mechanism to avoid ABS thresholds and therefore to provide for partial operation of the regenerative braking mechanism. In another example, for an acceleration operation, the computer 105 selects operational parameters for a combustion power component of an acceleration system.

Following block 340, or block 335, if the first operating system is determined to be capable to fully meet the transient, in a block 345, those selected operational parameters for the first and second operating systems are applied by module 106 in the operation of the braking system to operate vehicle 101 according to the transient operation identified at the block 320. In the event that both of the first and second operating systems are to be operated by the selected parameters 116, the selected parameters may also dictate the order of operation for the systems. After the application, at the block 345, of the operational parameters selected from the stored parameters 116 at blocks 330 and/or 340, then the block 350 is executed next, to determine if vehicle 101 is to remain in autonomous mode. If not, the process 300 ends. If vehicle 101 remains in autonomous operation, process 300 returns to the blocks 305, 310, and 315.

CONCLUSION

Computing devices such as those discussed herein generally each include instructions executable by one or more computing devices such as those identified above, and for carrying out blocks or steps of processes described above. For example, process blocks discussed above may be embodied as computer-executable instructions.

Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in a computing device is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

In the drawings, the same reference numbers indicate the same elements. Further, some or all of these elements could be changed. With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The invention claimed is:

1. A system, comprising a computer in a vehicle, the computer comprising a processor and a memory, wherein the computer is configured to:
    compare vehicle path data and vehicle status data to a threshold of a regenerative first braking mechanism for a vehicle;
    determine a deceleration requirement for the vehicle according to the comparison;
    select one or more operational parameters for at least one of the regenerative first braking mechanism and a second braking mechanism according to the comparison; and
    apply the selected operational parameters to operation of at least one of the regenerative first braking mechanism and second braking mechanism;
    wherein the operational parameters vary according to at least one of a road surface condition and a weather condition; and
    the threshold is based on engagement criteria of an anti-lock brake system.

2. The system of claim 1, wherein the determination of the deceleration requirement includes maximizing operation of the regenerative first braking mechanism.

3. The system of claim 1, wherein the comparison of the vehicle path data and the vehicle status data includes calculating a demanded torque for a deceleration target, and the threshold of the regenerative first braking mechanism is based on a torque limit.

4. The system of claim 1, wherein the comparison of the vehicle path data and the vehicle status data includes calculating a regenerated power amount for a deceleration target, and the threshold of the regenerative first braking mechanism is based on a power storage capacity of the vehicle.

5. The system of claim 1, wherein the vehicle path data includes at least one of location information, communication from another vehicle, a road condition, and destination information.

6. The system of claim 1, wherein the second braking mechanism is a friction braking mechanism.

7. A system, comprising a computer in a vehicle, the computer comprising a processor and a memory, wherein the computer is configured to:
    compare vehicle path data and vehicle status data to a threshold of an electrical power component of an acceleration system for a vehicle;
    determine an acceleration requirement for the vehicle according to the comparison;
    select one or more operational parameters for at least one of the electrical power component and a combustion power component of the acceleration system according to the comparison; and
    apply the selected operational parameters to operation of at least one of the electrical and combustion power components;
    wherein the operational parameters vary according to at least one of a road surface condition and a weather condition.

8. The system of claim 7, wherein the comparison of the vehicle path data and the vehicle status data includes calculating a demanded acceleration power amount for an acceleration target, and the threshold of the electrical power component of the acceleration system is a power limit.

9. The system of claim 7, wherein the determination of the acceleration requirement includes maximizing operation of the electrical power component.

10. The system of claim 7, wherein the vehicle path data includes at least one of location information, communication from another vehicle, a road condition, and destination information.

11. A method, comprising:
    comparing vehicle path data and vehicle status data to a threshold of a regenerative first braking mechanism for a vehicle;
    determining a deceleration requirement for the vehicle according to the comparison;
    selecting one or more operational parameters for at least one of the regenerative first braking mechanism and a second braking mechanism according to the comparison; and
    applying the selected operational parameters to operation of at least one of the regenerative first braking mechanism and second braking mechanism;
    wherein the operational parameters vary according to at least one of a road surface condition and a weather condition; and
    the threshold is based on engagement criteria of an anti-lock brake system.

12. The method of claim 11, wherein the determination of the deceleration requirement includes maximizing operation of the regenerative first braking mechanism.

13. The method of claim 11, wherein the comparison of the vehicle path data and the vehicle status data includes calculating a demanded torque for a deceleration target, and the threshold of the regenerative first braking mechanism is based on a torque limit.

14. The method of claim 11, wherein the comparison of the vehicle path data and the vehicle status data includes calculating a regenerated power amount for a deceleration target, and the threshold of the regenerative first braking mechanism is based on a power storage capacity of the vehicle.

15. The method of claim 11, wherein the vehicle path data includes at least one of location information, communication from another vehicle, a road condition, and destination information.

16. The system of claim 11, wherein the second braking mechanism is a friction braking mechanism.

* * * * *